(12) United States Patent
Brown

(10) Patent No.: US 6,516,771 B1
(45) Date of Patent: Feb. 11, 2003

(54) METHOD AND SYSTEM FOR EXTENDING ENGINE OIL LIFE

(75) Inventor: William L. Brown, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/962,833

(22) Filed: Sep. 25, 2001

Related U.S. Application Data
(60) Provisional application No. 60/312,589, filed on Aug. 15, 2001.

(51) Int. Cl.⁷ ................................................. F01M 1/00
(52) U.S. Cl. ................................ 123/196 R; 123/196 S
(58) Field of Search ................................ 123/588, 585, 123/196 R, 196 S

(56) References Cited

U.S. PATENT DOCUMENTS

| | | | | |
|---|---|---|---|---|
| 5,636,619 A | * | 6/1997 | Poola et al. | 123/585 |
| 5,649,517 A | * | 7/1997 | Poola et al. | 123/585 |
| 6,076,496 A | * | 6/2000 | Ferralli | 123/196 S |
| 6,076,497 A | * | 6/2000 | Ferralli | 123/196 S |

* cited by examiner

Primary Examiner—Willis R. Wolfe
Assistant Examiner—Jason Benton
(74) Attorney, Agent, or Firm—Robert J Hampsch

(57) ABSTRACT

A method and system for introduction of nitrogen enriched air into the crankcase of an internal combustion engine is disclosed. The introduction of the nitrogen-enriched air operates to extend the oil life of the oil present in the engine crankcase due to decreased oxidation of the engine oil.

14 Claims, 2 Drawing Sheets

METHOD AND SYSTEM FOR EXTENDING ENGINE OIL LIFE

This application claims the benefit of prior provisional patent application Ser. No. 60/312,589 filed Aug. 15, 2001.

TECHNICAL FIELD

The present invention relates to a method and system for improving or extending oil life in an internal combustion engine, and more particularly a system and method for introducing of nitrogen enriched air into a crankcase of an internal combustion engine.

BACKGROUND OF THE INVENTION

In recent years, internal combustion engine makers have been faced with ever increasing customer and regulatory requirements. These requirements have been directed mainly at two aspects of engine performance, including fuel economy, reliability, maintainability and, of course emissions. Several important characteristics of engine performance are engine oil consumption and oil change interval.

Modern diesel engines have relatively large oil capacities, and it is therefore important and advantageous to decrease the engine oil consumption and also extend the useful life of engine oil during the normal operation of a diesel engine. There are numerous prior art references that suggest the engine parameters and variables that contribute to oil degradation, and attempt to monitor such parameters and variables so as to predict the engine oil consumption and oil useful life. However, there is little technology available to engine makes and customers, other than oil additives, that are effective in extending oil life or oil change intervals.

Recent advancements in diesel engine air system technologies have resulted in a technology referred to as intake air separation. Separated air (either oxygen enriched air or nitrogen enriched air) has a number of previously disclosed and beneficial uses within an internal combustion engine and a diesel engine in particular. See, for example, U.S. Pat. No. 5,649,517 (Poola et al.) which discloses the use of a semi-permeable gas membrane to remove a portion of nitrogen from the intake air flow to create an oxygen enriched air supply and a nitrogen enriched air supply and the varied uses of each. See also U.S. Pat. Nos. 5,526,641 (Sekar et al.) and 5,640,845 (Ng et al.) which disclose air separation techniques and applications for oxygen enriched air as well as nitrogen enriched air in an engine.

However, notwithstanding the disclosed uses of the nitrogen-enriched air and oxygen enriched air, further applications of this technology are still being sought. The present invention applies the air separation technology to the problem of extending oil change intervals and otherwise extending oil life.

DISCLOSURE OF THE INVENTION

The present invention is a method and system for extending engine oil life through the introduction of nitrogen enriched air into the crankcase of an engine or other suitable engine location. The method of extending oil life in an engine comprises the steps of separating a flow of air into a flow of oxygen enriched air and a flow of nitrogen enriched air; and directing the nitrogen enriched air into the engine at locations where lubricating oil is present. Alternatively, the method may be characterized as comprising the steps of providing a source of nitrogen enriched air and subsequently introducing the nitrogen enriched air into the engine at locations where lubricating oil is present so that the oxidation rate of the lubricating oil is reduced thereby extending oil life.

The invention may also be characterized as a system for extending oil life in an internal combustion engine. The system includes an air separating device adapted for separating a flow of air into a flow of oxygen enriched air and a flow of nitrogen enriched air. The system for extending oil life also includes a nitrogen enriched air conduit coupled to the air separation device for transporting the nitrogen enriched air into the engine at selected locations where engine oil is present.

BRIEF DESCRIPTION OF THE DRAWINGS

The present invention will be more apparent from the following more particular description thereof, presented in conjunction with the following drawings, in which.

Corresponding reference numbers indicate corresponding components throughout the several views of the drawings. Certain features and elements illustrated in the drawings may be repositioned and certain dimensions and relative sizes may be exaggerated to better explain the invention.

DETAILED DESCRIPTION OF THE INVENTION

The following description includes the best mode presently contemplated for carrying out the invention. This description is not to be taken in a limiting sense but is made merely for the purpose of describing the general principals of the invention. The scope and breadth of the invention should be determined with reference to the claims.

Figure 1:
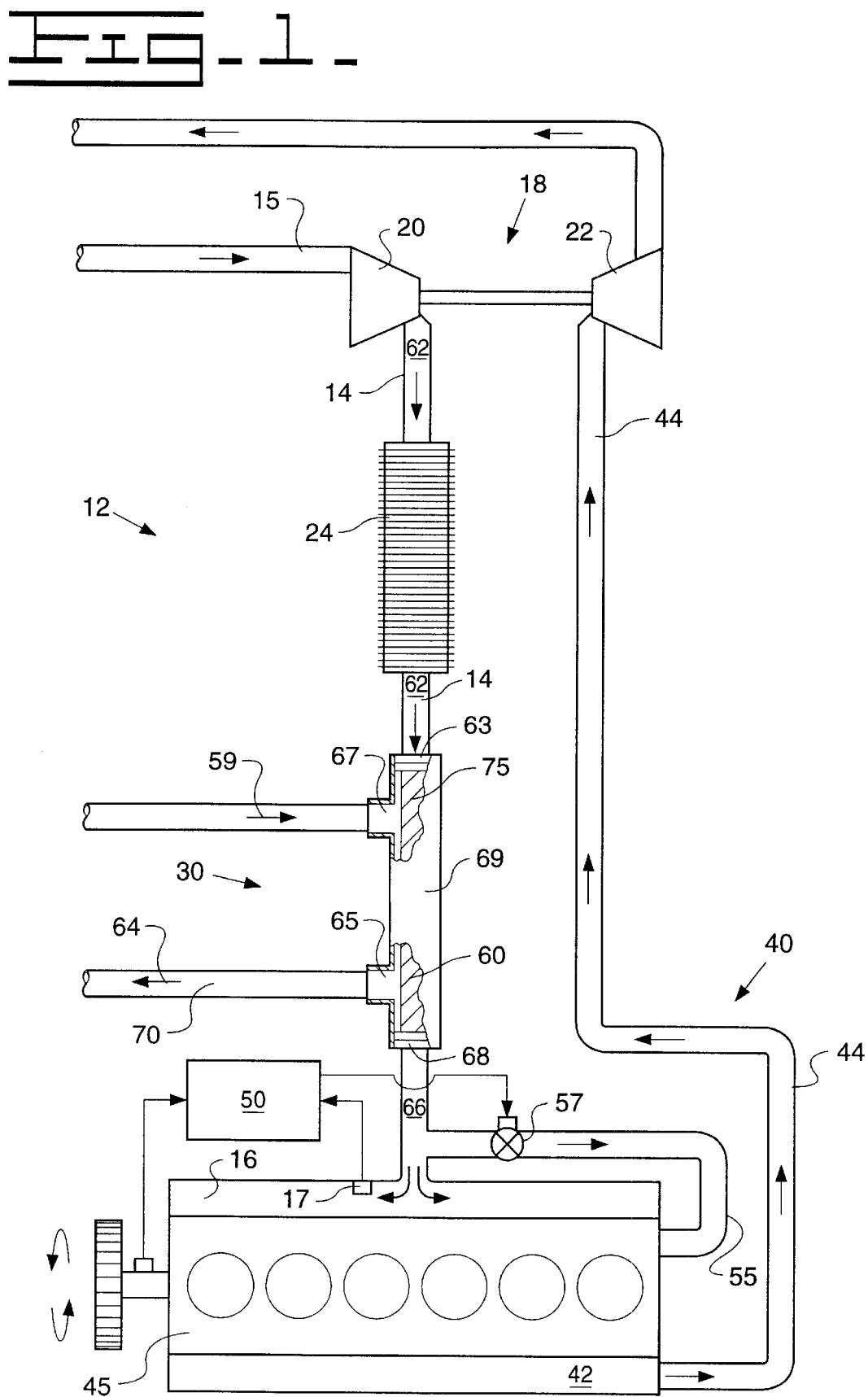
FIG. 1 depicts a schematic diagram of an internal combustion engine incorporating the nitrogen enriched air system in accordance with the present invention.

Turning now to the drawings and particularly FIG. 1, there is shown a schematic diagram of a diesel engine system 12. The air intake system of the diesel engine system 12 includes an intake air conduit 14, an intake manifold 16, intake air pressurizing device 18 or turbocharger, an intercooler or an air to air aftercooler (ATAAC) 24, and an air separation device 30.

The diesel engine system 12 also includes a main combustion section, and an exhaust system 40. Although not shown in great detail, the typical main combustion section includes, cylinder head, fuel injection components, valve train components, combustion cylinders, liners, pistons, connecting rods, crank shaft among other elements, much of which is contained within an engine crankcase 45. It is important to note that air passages within the engine crankcase remain separate from the intake air system used to transport intake air for combustion.

The exhaust system 40 of the diesel engine system 12 includes an exhaust manifold 42 or split exhaust manifolds, one or more exhaust conduits 44, and an exhaust gas driven turbine 22, which drives the intake air compressor 20. Optionally, the exhaust system 40 may include one or more aftertreatment devices (not shown) such as particulate traps, NOx adsorbers, oxidation and/or lean NOx catalysts, or other recent advances in exhaust gas aftertreatment. Finally, the engine 12 includes an engine control module (ECM) 50 for operatively controlling the fuel injection timing and air system valve operations in response to one or more measured or sensed engine operating parameters, used as inputs to the ECM 50.

As seen in FIG. 1, the intake air conduit 14 is in flow communication with intake air input 15, the compressor 20 of the exhaust gas driven turbocharger 18, and the ATAAC 24. The intake manifold 16 is connected to an end of the intake air conduit 14. An inlet pressure sensor 17 is shown located somewhere in the intake air system (i.e. shown proximate the intake manifold 16) and provides intake air pressure data to the ECM 50. Other sensors such as temperature sensors, engine speed sensors, oxygen sensors, etc. may also be incorporated within the intake air system and likewise coupled as inputs to the ECM 50. In addition, various other devices such as filters, valves, actuators, bypass conduits, etc., although not shown, may also be incorporated within the intake air system. Any such electronically operative components such as a variable geometry turbocharger, or other valves and/or actuators are preferably operatively coupled to the ECM 50 and operate in response to selected engine operating parameters or conditions, including engine speed, engine load, boost pressure conditions, etc.

Figure 2A:
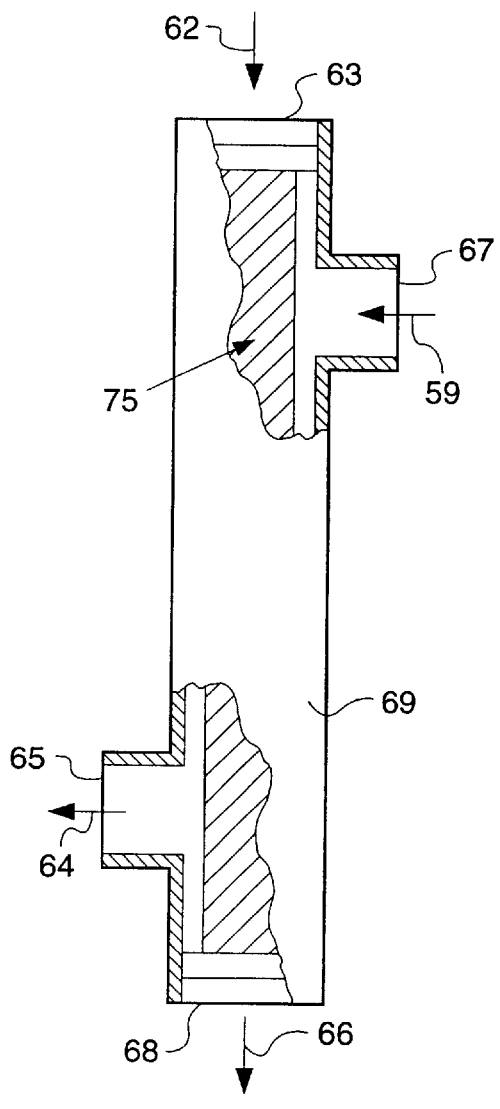
FIGS. 2a and 2b depict partial cut-away diagrams of the air separation devices contemplated for use in the disclosed embodiments of the present nitrogen enriched air system.

Turning for a moment to FIG. 2a, there is shown an embodiment of the air separation membrane device 30. As seen therein, the air separation device includes a housing or shell 69, having an intake air inlet 63, and a purge air inlet 67, a permeate outlet 65, and a retentate outlet 68. A plurality of selectively permeable membranes 75 are disposed in a general longitudinal orientation within the housing and potted or sealed at each end. The membranes 75 are preferably hollow, porous, coated tubes through which selected gases such as hydrogen, helium, water vapors, carbon dioxide, and oxygen tend to permeate outwardly through the membrane at a relatively fast rate while other gases, such as carbon monoxide, argon and nitrogen permeate less rapidly and are mostly retained and transported along the membrane. Different gases present in the intake or feed air tend to permeate through the membrane 75 at different relative permeation rates and generally through the sidewalls of the membrane. The rates of permeation are also dependent, in part, on the membrane temperature and partial pressures of the retentate and permeate flows. Thus, altering or controlling the temperatures and pressures of gases entering and exiting the air separation device ultimately controls permeability.

The intake air 62 is introduced into the intake air separation housing 69 and air separation membrane in an orientation or direction that is generally lengthwise along that of an axis of permeable membranes 75. In this manner the intake air is transported or flows generally along the length of the air separation unit 30. Conversely, the flow of purge air 59 is introduced into the air separation housing 69 and air separation membrane 75 in a cross flow orientation or direction such that the purge air 59 flows generally across the outer surfaces of the membrane. The purge air then exits the air separation housing 69 via the permeate outlet 65 as part of the permeate flow 64 and together with the permeated oxygen rich air. The retentate flow 66 of nitrogen rich air exits from the air separation housing 69 via retentate outlet 68.

Figure 2B:
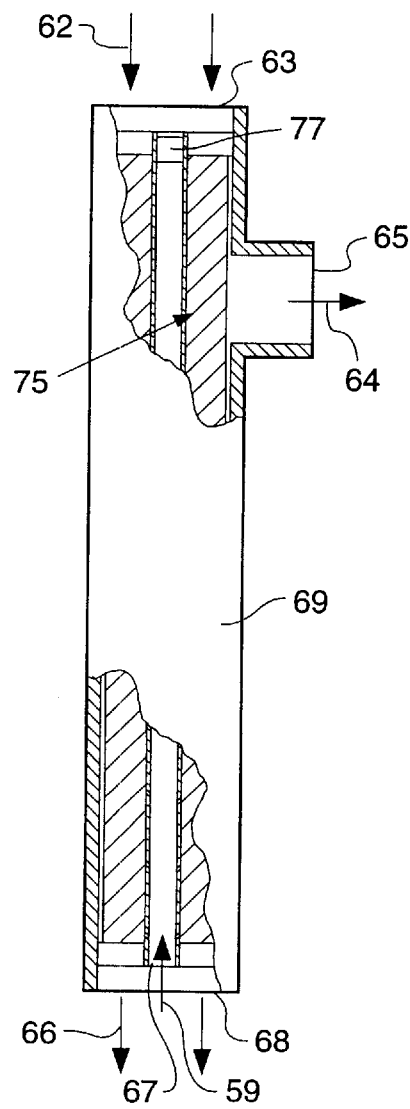

FIG. 2b shows an alternate embodiment of the air separation membrane device 30'. As with the embodiment of FIG. 2a, the air separation device 30' of FIG. 2b also includes a generally cylindrical housing 69', a plurality of selectively permeable membranes 75', an intake air inlet 63', a purge or sweep air inlet 67', a permeate/purge outlet 65', and a retentate outlet 68'. However, the embodiment of FIG. 2b illustrates a different flow orientation and includes a central purge air conduit through which the purge air 62' flows into the separation device 30' and a plug 77, which forces the sweep air or purge air 59' flow outwardly across the air separation membrane 75' and exits via permeate outlet 65'.

FIGS. 2a and 2b illustrate mere examples of sweep or purge airflow configurations that produce good air separation results, although various other flow configurations can also be employed. The various purge flow and intake airflow configurations offer differences in separation performance and packaging issues and can be tailored to the specific application in which the air separation device is used.

Referring back to FIG. 1, the illustrated embodiment includes an intake air separation device 30 disposed in the intake air system of engine system 12. As with some of the prior art engine air separation systems, the intake air separation device 30 is adapted for receiving intake air 62 at an air separation device inlet 63 and separating the same into a flow of oxygen enriched air 64, which is combined with any purge air 59 or sweep air present within the air separation housing 69, and a flow of nitrogen enriched air 66. The illustrated intake air separation device 30 includes two inlets and two outlets. The first inlet is the intake air inlet 63 that receives the intake air 62 to be separated into an oxygen rich flow or stream 64 and a nitrogen rich stream 66. The second inlet is a purge air inlet 67 that is adapted to receive a flow of sweep air or purge air 69 which enhances the permeation effectiveness of the air separation membrane 75. The first outlet, or permeate outlet 65 of the air separation device 30 is adapted to receive the permeate flow 64 of oxygen enriched air combined with purge air.

The second outlet, or retentate outlet 68 is adapted to receive the retentate flow 66 of nitrogen enriched air. The second outlet or retentate outlet 68 is further in flow communication with various nitrogen enriched air induction points. For example, the retentate outlet 68 may be in flow communication with the intake manifold 16 of the engine system 12 as shown, or although not shown, coupled to the exhaust system 40. The preferred embodiment however, contemplates the retentate outlet 68 coupled to an auxiliary nitrogen conduit 55 that is disposed in flow communication to the engine housing or crankcase 45. This arrangement of coupling the nitrogen-enriched air to the engine housing or crankcase may be in lieu of or in addition to the nitrogen enriched air flowing to the intake manifold 16.

As seen in FIG. 1, a flow control device 57 is preferably disposed along the auxiliary nitrogen conduit 55 and is preferably actuated in response to signals received from ECM 50 which controls the auxiliary nitrogen enriched air flow to the engine crankcase 45. Optionally, a small nitrogen enriched air plenum (not shown) may be employed to store a volume of nitrogen enriched air to be introduced to the engine crankcase or other suitable engine location where engine oil is present, such as a gear housing (not shown).

Although the present system and method are shown and described with reference on a turbocharged, after-cooled, direct injection diesel engine, numerous other embodiments are also contemplated. For example, the present invention would be useful on numerous different engine configurations, including naturally aspirated engines, closed circuit breathers, open circuit breathers, alternate fuel engines, natural gas engines, dual fuel engines, etc.

Industrial Applicability

The preferred operation the above-described system for introduction of nitrogen enriched air into the crankcase of an engine or other suitable location includes the basic steps of: separating a flow of engine intake air into a flow of oxygen enriched air and a flow of nitrogen enriched air; and directing the nitrogen enriched air into the engine at specified locations where engine oil is present. The reduction in oxygen content of the air present in the engine crankcase is advantageous in that the oxidation of the engine oil is presumably decreased, thereby contributing to possible extensions in engine oil life.

The timing, delivery, and volume of the nitrogen enriched air introduced into the engine crankcase or other suitable engine location as well as the nitrogen content of the flow introduced into the engine crankcase is controllable so as to obtain the maximum or preferred oil life extension for the given the engine application. Many of the aforementioned variables can be determined empirically and suitably programmed into the engine control module (ECM). For Adz example, it may be advisable to divert the nitrogen-enriched air only during engine idle conditions so as to limit the effect of such air diversion during other operational conditions. Likewise, it may be advisable to divert the nitrogen-enriched air mainly during transient engine operation conditions where excess oxygen is preferred for the engine combustion. Depending on the permeate and retentate flow configurations, bleeding off only nitrogen enriched air to the engine crankcase at such times could operate to temporarily increases the relative oxygen concentration directed to the engine for combustion.

Finally, the ECM can be tailored to predict the engine oil life based on recorded events (volume, frequency, duration) of nitrogen enriched air introduction into the crankcase coupled with other engine operating parameters and diagnostic algorithms commonly used to predict engine oil life.

From the foregoing, it can be seen that the disclosed invention is a system and method for extending engine oil life through the introduction of nitrogen enriched air into the crankcase of a diesel engine. While the invention herein disclosed has been described by means of specific embodiments and methods or processes associated therewith, numerous changes, modifications, and variations could be made thereto by those skilled in the art without departing from the scope of the invention as set forth in the claims.

What I claim is:

1. A method of extending oil life in an internal combustion engine comprising the steps of:

separating a flow of engine intake air into a flow of oxygen enriched air and a flow of nitrogen enriched air; and introducing said flow of nitrogen enriched air into said engine at locations where engine oil is present;

wherein the oxidation rate of the oil is reduced thereby extending oil life.

2. The method of claim 1 wherein the step of introducing said flow of nitrogen enriched air into said engine further comprises the step of directing said flow of nitrogen enriched air into an engine crankcase.

3. The method of claim 1 wherein the step of introducing said flow of nitrogen enriched air into said engine further comprises the step of directing said flow of nitrogen enriched air into a gear housing.

4. The method of claim 1 wherein the step of separating a flow of engine intake air into a flow of oxygen enriched air and a flow of nitrogen enriched air further comprises passing said intake air through a selectively permeable membrane adapted for separating said intake air into a stream of oxygen enriched air and nitrogen enriched air.

5. The method of claim 2 further comprising the step of controlling the introduction of said nitrogen enriched air into the engine crankcase in response to selected engine operating conditions.

6. A method of extending oil life in an engine comprising the steps of:

providing a source of nitrogen enriched air; and introducing said nitrogen enriched air into said engine at locations where lubricating oil is present;

wherein the oxidation rate of the oil is reduced thereby extending oil life.

7. The method of claim 6 wherein the step of providing a source of nitrogen enriched air further comprises the step of creating a flow of said nitrogen enriched air from engine intake air.

8. The method of claim 6 wherein the step of introducing said nitrogen-enriched air into said engine further comprises the step of directing said nitrogen enriched air into an engine crankcase.

9. The method of claim 1 wherein the step of introducing said nitrogen-enriched air into said engine further comprises the step of directing said nitrogen enriched air into a gear housing.

10. A system for extending oil life in an internal combustion engine comprising:

an air separating device adapted for separating a flow of air into a flow of oxygen enriched air and a flow of nitrogen enriched air; and a nitrogen enriched air conduit coupled to said air separation device for transporting said nitrogen enriched air to said engine at selected locations where lubricating oil is present;

wherein the oxidation rate of the oil is reduced thereby extending oil life.

11. The system of claim 10 wherein said nitrogen enriched air conduit is coupled to an engine crankcase wherein said nitrogen enriched air is introduced into said engine crankcase.

12. The system of claim 10 wherein said nitrogen enriched air conduit is coupled to a gear housing wherein said nitrogen enriched air is introduced into said gear housing.

13. The system of claim 10 further comprising:

a valve disposed in said nitrogen enriched air circuit; and an engine control module operatively coupled to said valve and adapted for controlling the introduction of said nitrogen enriched air into the engine in response to selected engine operating conditions.

14. The system of claim 10 wherein said air separating device is disposed in said intake air system and is adapted for separating a flow of engine intake air into a flow of oxygen enriched air and a flow of nitrogen enriched air.

* * * * *